April 19, 1966  L. E. REDMAN ET AL  3,246,953
APPARATUS FOR COMPOSTING WASTE MATERIAL
Filed Dec. 14, 1961  5 Sheets-Sheet 2
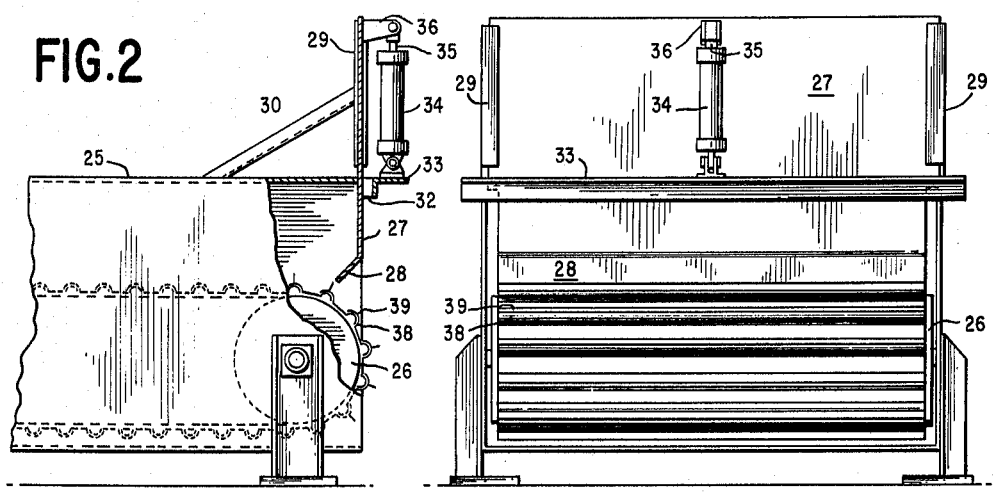
FIG.2
FIG.3
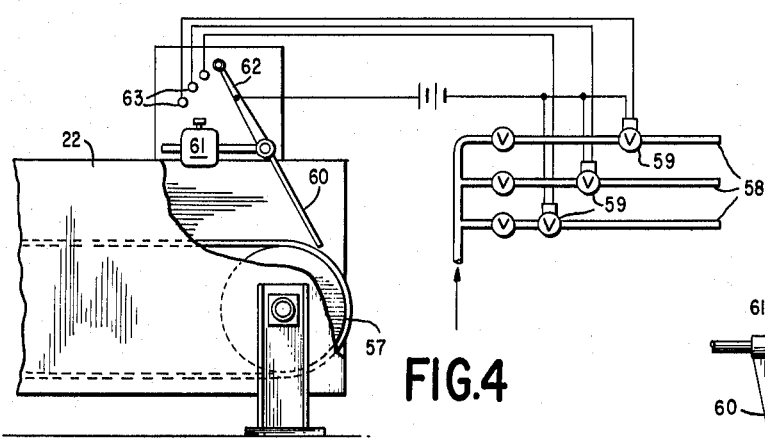
FIG.4
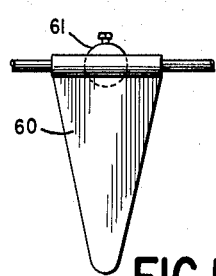
FIG.5
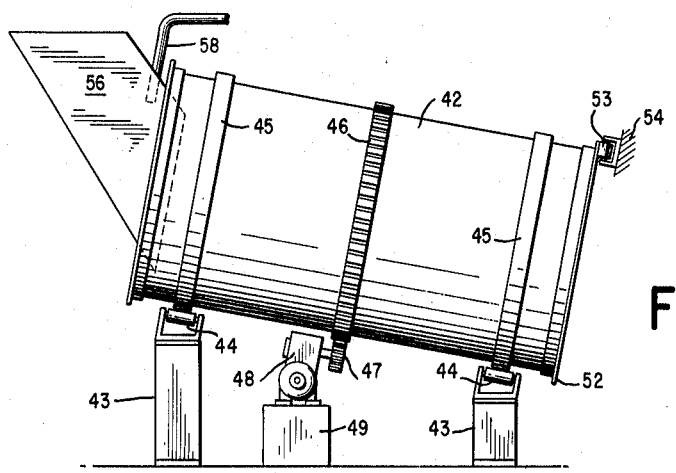
FIG.6
INVENTORS
LAWRENCE E. REDMAN
WILLIAM J. GOLDFIELD
BY
ATTORNEYS

INVENTORS
LAWRENCE E. REDMAN
WILLIAM J. GOLDFIELD
BY
ATTORNEYS

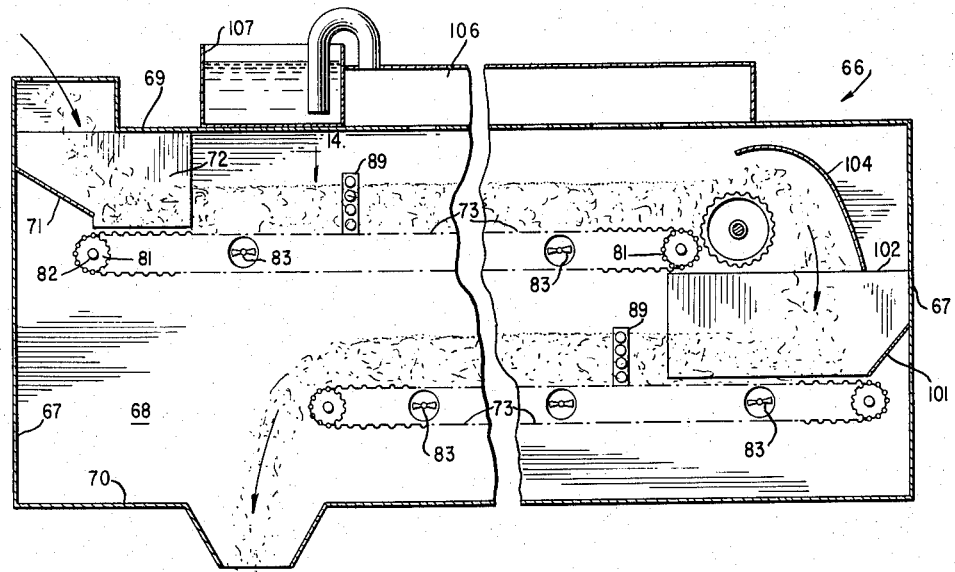
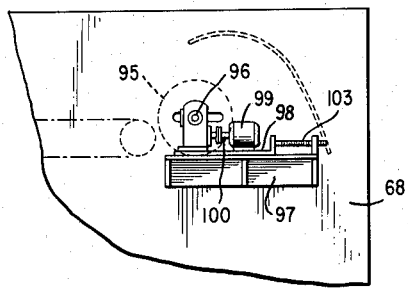
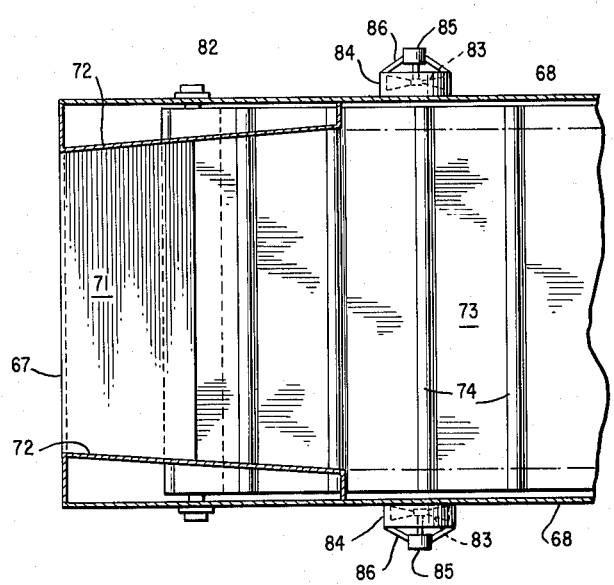

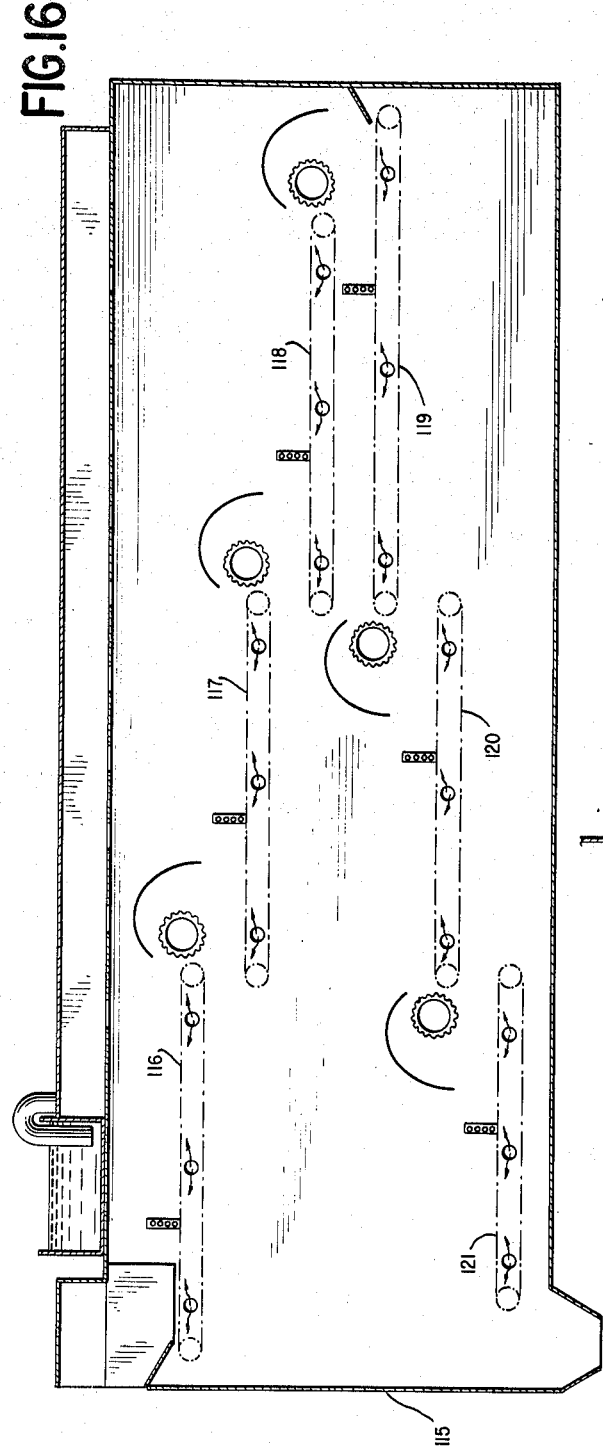
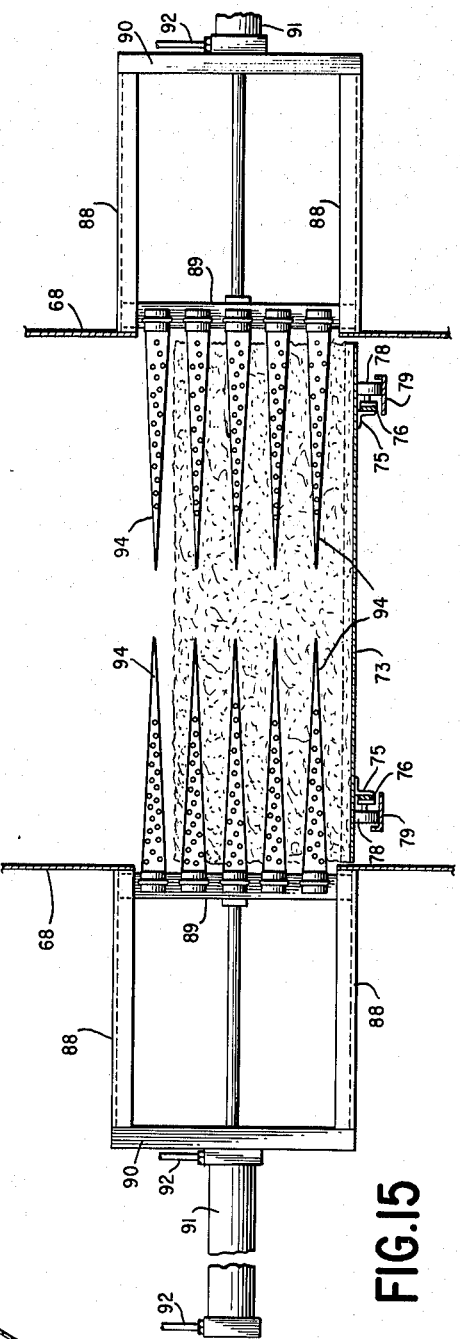
FIG.16
FIG.15
INVENTORS
LAWRENCE E. REDMAN
WILLIAM J. GOLDFIELD
BY
ATTORNEYS

United States Patent Office 3,246,953
Patented Apr. 19, 1966

3,246,953
APPARATUS FOR COMPOSTING WASTE
MATERIAL
Lawrence E. Redman, Phoenix, Ariz., and William J. Goldfield, Norman, Okla., assignors to Sanitation Associates, Inc., North Miami, Fla., a corporation of Florida
Filed Dec. 14, 1961, Ser. No. 159,253
6 Claims. (Cl. 23—259.1)

The present invention relates to an improved process in the composting of waste materials, such as refuse containing both organic and inorganic constituents, and an apparatus for such a process.

The refuse that is usually collected in municipalities and urban communities consists of a great variety of waste products that are disposed of by the average business establishment or homeowner. The term "waste materials" is commonly employed to denote not only refuse such as paper, glass, rags, and the like, but also garbage which consists primarily of waste food products and table scraps.

At the present time, a large portion of the garbage acquired during a normal day in a conventional household, whether it be city or urban, is normally disposed of through the use of waste or garbage disposals that are connected to the plumbing system of the household whereby the garbage may be ground up and flushed through the sanitation system. In situations of this type, the greater proportion of the waste material that is collected through scheduled operations consists primarily of inorganic material. There are, however, many establishments such as restaurants, cafes, hotels, apartments and the like wherein garbage disposals are not provided and the refuse must, therefore, be collected and disposed of through one of several means, such as a city dump, a land-fill operation or by incineration. None of the aforementioned means is in and of itself entirely satisfactory for one reason or another, as the city dump usually presents an eyesore as well as being a smoke and odor nuisance, while an incinerator in many instances produces fly ash and also involves an expensive operation requiring the use of fuel to complete the destruction of the waste material and one wherein benefits are not realized from said material. A land-fill operation, while possibly being the most economical operation, requires constant attention in the leveling and burying of the collected waste material so that said material when decomposed is never utilized in the manner to which it may readily be applied.

In an effort to dispose of waste material and yet obtain an end product which may readily be utilized and become a saleable item, various and sundry attempts have been directed to devising a process and an apparatus for the composting or converting of both organic and inorganic material to a humus through the action of microorganisms. While such efforts have been directed to the composting of waste material on a commercial scale, many of the processes so devised have required a rather long and extended period of time to completely effect the decomposition of the waste material to produce as an end product a satisfactory soil nutrient or humus. In some instances, an anaerobic bacterial process has been followed which, in and of itself, will produce a satisfactory and marketable humus. However, such a process is one which, during the composting of the waste material, produces a very obnoxious and offensive gas product that invariably eminates to the atmosphere and becomes extremely objectionable to anyone in the surrounding or adjacent vicinity. In an effort to avoid the obnoxious gas resulting from the anaerobic process, numerous efforts have been directed to the composting of waste material by an aerobic bacterial digesting process which permits both refuse and garbage that have been delivered to the composting apparatus to be subjected to an aerobic thermophilic fermentation. While the latter process does avoid the generation and emission of obnoxious gasses due to the fact that air is being directed over the refuse material, the processes devised heretofore have usually required an unusually long period of time to effect the composting of the material and in many instances certain layers or strata of the material are not completely composted due to the lack of proper aeration.

The present invention contemplates an economical process of producing a stabilized compost product through a completely aerobic process, which process consists of the composting of municipal refuse as well as other waste products and wherein the aerobic decomposition of said waste products is achieved by means of various mechanical devices that include improvements in the design of the conveyor means for moving the composting material through the various decomposition chambers while at the same time controlling the air that is introduced to said material.

The process of producing a stabilized compost-like product through an aerobic process, as set forth in the present application and which constitutes the inventive concept of this application, involves the collecting of the waste products that are moved through a picking or salvaging area which is provided with suitable gate means for controlling the passage of material therethrough, whereby any and all salvageable material is removed from the municipal refuse and waste products, after which the refuse and waste products move through a mixing chamber wherein said refuse and products are suitably moistened by a particular liquid maintained in a suitable storage container. The properly mixed and moistened material is then introduced into a suitable grinder from whence it is delivered by suitable means to the first of a plurality of decomposition chambers. The first decomposition chamber contains two stages through which the material is conveyed within a certain time element and during the passage through these two stages the composting material is subjected to an aerating process which includes suitable means for maintaining and controlling the delivery of air into said chamber and over, around and through the conveyed material dependent upon the temperature that is attained and maintained within said material. The composting material in passing from the first stage to the second stage within the first decomposition chamber is subjected to an aerating or fluffing operation for the purpose of presenting new areas or surfaces of the material to the air that is introduced into said chamber, thereby materially aiding and expediting the composting of the material.

The composting material is delivered from the first decomposition chamber to a suitable grinder from whence it moves to a second decomposition chamber that consists of two stages designed and operated in the same manner as the two stages in the first decomposition chamber. Subsequent to the movement of the composting material through the second decomposition chamber, said material is then introduced into another grinder from whence it is then delivered to a third decomposition chamber which embodies the fifth and sixth stages of the composting operation. The composting material is then delivered from the third decomposition chamber through a suitable grinder and then to screening operation from whence the finished product is obtained. The final screening operation delivers the unscreened or rejected material to the grinder interposed between the first and second decomposition chambers for the purpose of recycling and reintroducing into the composting material this rejected material obtained at the final screening operation so that said material is then moved through the second and third decomposition chambers to further effect the composting of this material while at the same time this rejected material constitutes a bacteria additive that is mixed with the material that is received from the first decomposition chamber.

One of the objects of the present invention is to provide a composting apparatus having means for homogenously aerating the waste material to obtain an aerobic thermophilic fermentation of said waste material.

Another object is to provide an apparatus for rapidly and thoroughly composting waste organic and inorganic materials into humus.

Another object is to provide a substantially complete aerobic composting of waste material to produce a humus through the action of micro-organisms.

Another object is to provide an apparatus for the composting of waste materal, which apparatus is highly efficient and economical of operation and which is continuous and capable of composting said material within a relatively short period of time.

Other objects and advantages, more or less ancillary to the foregoing in the manner in which all of the various objects are realized, will appear in the following description which, when considered in connection with the accompanying drawings, sets forth the preferred embodiment of the invention.

FIG. 2 is a side elevational view of a portion of the delivery end of a refuse feed-control station with portions thereof shown in section in the interest of clarity;

FIG. 3 is an end elevational view of the delivery end of the refuse feed-control station showing the conveyor and the reciprocating gate associated therewith;

FIG. 4 is a side elevational view of a portion of the discharge end of a picking station with portions shown in section in the interest of clarity and to further illustrate the swinging gate or arm member that controls the delivery of moisture to the material;

FIG. 5 is an end elevational view of the gate or arm mounted at the end of the picking station;

FIG. 6 is a side elevational view of a mixer showing moisture-delivering nozzles positioned at the entrance end of the mixer and which nozzles are controlled by means of the gate or valve member shown in FIG. 4;

FIG. 8 is a side elevational view of a decomposition chamber showing the endless conveyors disposed therein for receiving and moving the composting materials therein;

FIG. 13 shows in some detail the driving means for the aerator fluffing member of FIG. 12;

FIG. 14 is a top plan view of a delivery or guide chute and a portion of a conveyor for receiving the composting material;

FIG. 15 is a vertical sectional view through the decomposition chamber showing a plurality of perforating aerating members positioned at each side thereof for engaging the material on the conveyor; and FIG. 16 shows a modified form of a decomposition chamber wherein all of the stages through which the composting material is moved, are positioned within a single chamber.

Figure 1:
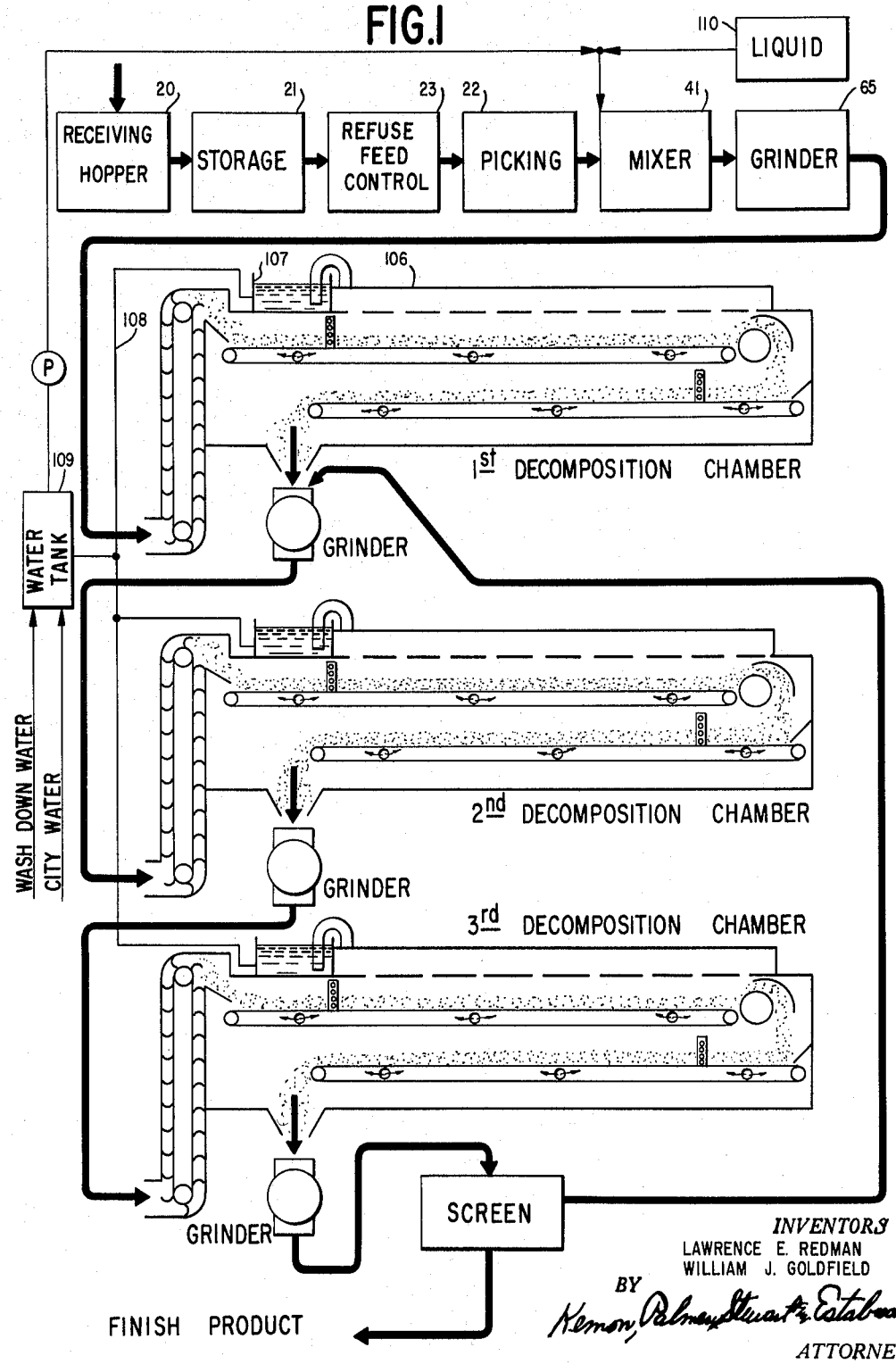
FIG. 1 is a schematic flow chart illustrating the present invention.

Referring to the drawings, there is shown in FIG. 1, a hopper 20 into which the municipal refuse and waste products are delivered by the usual refuse collection trucks (not shown) from whence the composting material is moved by suitable conveyors into a storage area or station 21. The material to be composted is maintained within the storage area or station until sufficient refuse has been delivered to the conveyor so as to provide a continuous flow of municipal and waste refuse material as same moves through the composting plant. From the storage station 21, the material to be composted is conveyed into a picking station 22 moving through a refuse feed-control device 23, which control device is remotely operated from the picking station to vary and control the amount of refuse material that is delivered to said picking station. The reason for this is that the picking station permits any and all salvageable items to be removed from the conveyor as the refuse and waste material moves therethrough. At times, the rate of flow of material through the picking station could be at too rapid a rate or the removal of the salvageable items from the conveyor is such as to require the full attention of the operator so that it becomes necessary to slow down or retard the flow of material into said station. In an effort to control the movement of the material through the picking station, the refuse feed-control valve or gate member 23 is actuated remotely by the operators at the picking station.

As shown in FIGS. 2 and 3, the refuse feed-control device is mounted upon the external surface of a suitable housing 25 within which there is disposed an endless conveyor 26 which has associated therewith at its discharge or delivery end a vertically reciprocating gate member 27 that is formed with an angularly offset lower end portion to provide an inwardly extending lip 28. The refuse feed-control device may be mounted in any suitable manner at the discharge end of the housing 25 and, as shown in FIGS. 2 and 3, one form embodies a pair of vertically extending guide channel members 29 mounted on the upper edges of the housing 25 and suitably retained in position by angle brackets 30. The sides of the housing 25 are provided with angularly offset segmental portions 32 which have secured thereto a transversely extending brace member 33 which is adapted to pivotally support the lower end of a cylinder 34. The upper end of the cylinder 34 has a piston rod 35 projecting therefrom to which is secured by any suitable means a bracket 36 that is in turn fastened to the upper end of the gate member 27 so that upon suitable fluid medium being introduced into the cylinder 34 the piston therein will be caused to reciprocate thereby raising or lowering the gate member to the desired position at the discharge end of the housing 25. The conveyor 26 within the housing 25 has provided on the outer surface thereof transversely extending projections 38 that are arranged in spaced relation with one another and which in turn have vertically extending baffle members 39 mounted thereon. The projections 38 and baffles 39 tend to aid in the propulsion or movement of the refuse material into the picking area so that the positioning of the gate member 27 with respect to the conveyor can retard or prevent the passage of large and bulky items from the housing 25 to the picking station; yet, at the same time the movement of the conveyor will tend to move or carry forward other refuse material and the movement of said refuse material is assisted by the projections 38 and baffles 39.

Figure 7:
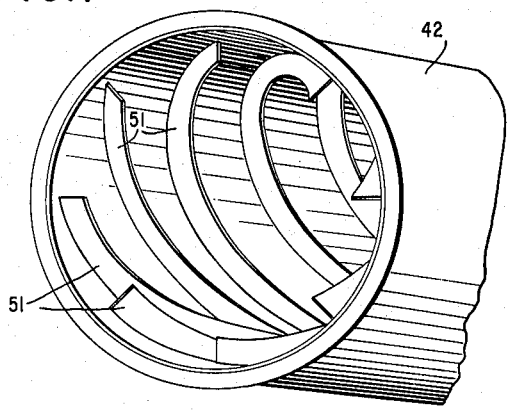
FIG. 7 is a detailed view showing the mixing and conveying vanes mounted upon the inner surface of the mixer drum.

The refuse and waste material that remains upon the conveyor, after it has moved through the picking station, constitutes the material to be composted which is conveyed to a mixer 41, which may be of any suitable design and configuration which will insure a thorough mixing of the material contemporaneous with the moistening or wetting of the material as it is moved through the mixer from the receiving to the discharge end thereof. There is shown in FIGS. 6 and 7 a mixer of a type that is readily adaptable to the composting process of the present invention and wherein said mixer consists of a drum 42 that is disposed at a slight incline from the entry or receiving end to its discharge end and which is mounted upon suitable supports 43 that have rollers 44 freely mounted in the upper end thereof for engagement with trackways 45 provided on the outer peripheral surface of the drum 42. The drum 42 has an external annular gear 46 secured to the central portion thereof which is engaged by a drive pinion 47 carried by a motor 48 that in turn is supported upon a motor block 49. The inner surface of the drum has secured thereto, in any suitable manner, a plurality of spaced blade members 51 for agitating and mixing the moisture-laden material while aiding in its movement through the mixer drum. The discharge end of the drum 42 is formed with an annularly extending flange member 52 which engages a thrust bearing 53 carried by a suitable support 54 to prevent the movement of the drum 42 in an axial direction thus insuring the retention of the trackways 45 upon the rollers 44 and the engagement of the annular gear 46 with the drive pinion 47.

The entry or refuse-receiving end of the drum 42 has a delivery chute or spout 56 associated therewith for directing and guiding the material to be composted from the conveyor 57 provided in the picking station 22, FIG. 4. The delivery chute 56 has a metered liquid additive device projecting through the upper portion thereof which consists of a plurality of spaced discharge tubes or nozzles 58, each of which is provided with a solenoid-actuated valve 59 that is in turn controlled by a swinging arm 60 pivotally supported at the discharge end of the picking station 22 and engageable with the conveyor 57. The arm 60 is provided with a suitable counterweight 61 which is adjustable so as to maintain the arm 60 in proper position for engagement with the conveyor 57. The arm 60 has also extending therefrom or connected thereto a contact lever 62 that is adapted to engage spaced contacts 63 upon the pivotal movement of the arm 60 whereby the valves 59 will be actuated to permit the passage and delivery of fluid through the nozzles 58 and onto the material to be composted as it moves through the chute 56 and into the mixing drum 42. Thus, the height or thickness of the refuse material that is mounted upon the conveyor 57 as it leaves the picking station 22 will determine the degree or amount of moisture that will be delivered by the tubes or nozzles 58 onto the said material prior to its entry into the mixing drum 42. While solenoid actuated valves have been shown, it is to be understood that any suitable type of valve actuating device may be employed whether same be actuated by an arm or lever engaged by material on a conveyor or by manual operation.

The material to be composed is delivered from the mixing drum 42 to a grinder 65 wherein said material is reduced to a particular size which will materially enhance the bacterial action of said material as it is moved through the decomposition chambers. The ground refuse or waste material is then delivered to an endless conveyor positioned within the upper portion of a decomposition chamber 66, FIG. 8. The ground refuse or waste material may be delivered directly to the endless conveyor disposed within the upper portion of the decomposition chamber, or it may be delivered to a pit having an endless bucket elevator associated therewith for collecting the material which is then delivered to the endless conveyor within the upper portion of the decomposition chamber.

Figure 10:
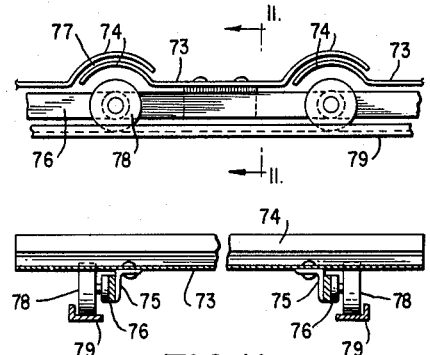
FIG. 10 is a side elevational view of a portion of the conveyor showing the overlapping arrangement of portions of said conveyor.
Figure 11:
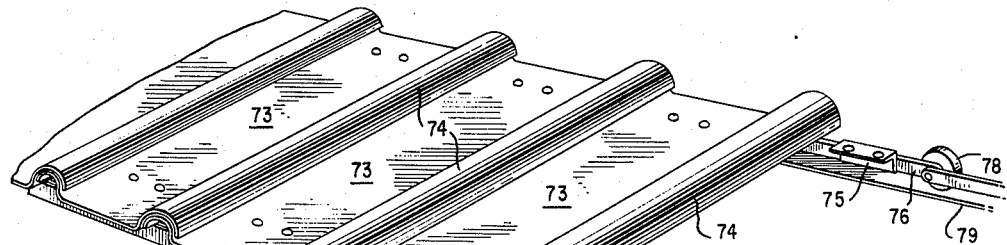
FIG. 11 is a vertical sectional view of the conveyor, the section being taken on a plane 11—11 of FIG. 10.
Figure 9:
FIG. 9 is a plan view of a conveyor employed within the decompositioning chamber.

As shown in FIG. 8, the decomposition chamber constitutes an elongated housing having end walls 67 and side walls 68 with a top wall 69 and a bottom wall 70, which are suitably joined to one another to provide a unitary relatively air-tight structure. One of the end walls 67 of the decomposition chamber 66 is provided with an inlet trough 71 for aiding in the delivery of the material to the upper run of the conveyor in the upper portion of said chamber. The inlet trough 71 has positioned adjacent thereto a guide chute 72 which is of a width slightly less than that of the decomposition chamber 66 and is also of a width slightly less than the width of the conveyor moving in the upper portion of the decomposition chamber. Thus, the ground refuse or waste material is delivered to the endless conveyor in the upper portion of the decomposition chamber by means of the guide chute 72 and due to the width of said chute the material is preformed as it is delivered onto the endless conveyor so as to be slightly spaced from the sides 68 of the decomposition chamber 66. Due to the moistening of the material in the mixer and the subsequent grinding thereof, said waste or refuse material in moving through the guide chute 72 is capable of being maintained in a pre-determined form as though same had been extruded through a die. As shown in FIG. 8, the decomposition chamber 66 has an endless conveyor disposed in the upper portion thereof for receiving the material to be composted from the guide chute 72 and said conveyor consists of a plurality of pan-like members 73, which have a relatively flat central section or portion terminating in arcuately shaped end segments 74, FIG. 9. The portions 73 of the conveyor elements have secured to their lower or bottom faces angle blocks 75 which in turn are suitably fastened to longitudinally extending connecting rail members 76. Thus, as the pan-like members 73 are fastened to the angle blocks 75, the arcuate end segments 74 of the adjacent pan members will overlap one another but the segment at one end of each pan member is of a slightly greater arcuate configuration than the segment at the co-acting end of the adjacent pan member. Thus, when the pan members are in their assembled position, on the blocks 75 and rail members 76, the segments of one end of one pan will overlap the segmental end of the adjacent pan but said segments will be disposed in spaced relation with one another to provide an air passage 77 therethrough, as shown in FIG. 10. The rails 76 have suitable rollers 78 mounted thereon which engage angle track members 79 that are suitably mounted within the chamber 66 intermediate spaced sprocket members 81 which are in turn rotatably mounted upon shafts 82 secured within the side walls 68 of the chamber 66. Either one or both of the sprockets 81 may be driven by a conventional motor (not shown) for the purpose of moving the endless conveyor within the upper portion of the decomposition chamber 66. The sprockets 81 are configured to engage the rollers 78 as to move the endless conveyor consisting of the pan-like members 73 from one end wall 67 towards the opposite end wall 67 of the decomposition chamber 66. The conveyor is adapted to be moved at a relatively slow rate of speed so that during a specified period of time, such as an eight-hour period, the conveyor will move only a distance approximately equal to the length of the upper run of the conveyor.

The side walls 68 of the decomposition chamber 66 have mounted therein intermediate the shafts 82 of the sprockets 81 a plurality of fans 83 which are disposed within suitable enclosures 84 carried by said side walls. The fans 83 are driven by suitable motors 85 which are adapted to be continuously operated for the purpose of introducing and replenishing the air while at the same time circulating air over and about the material as it moves through the upper portion of the decomposition chamber 66. The housings 84 for the fans 83 are provided with one-way inlet valves 86 which are actuated by the rotation of the fans within said housing. The inlet valves 86 are controlled by the fans 83 and the degree to which they open will be determined by the rotative speed of the fans so that the amount of fresh atmospheric air that is needed to effect the proper and correct decomposition of the material will be determined by the temperature of the material as it is being decomposed.

In addition to the use of fans 83 for circulating and moving the air within the decomposition chamber 66, means are also provided for aerating the waste or refuse material that is disposed upon and carried by the conveyor 73. As shown in FIG. 15, the side walls 68 of the decomposition chamber 66 have mounted on the outer surface thereof trackways or guideways 88 that are disposed in a plane normal to the plane of the sidewalls 68 and which are adapted to slidably receive therein headers 89. The outer ends of the trackways 88 are secured to a vertically extending supporting member 90 which has secured thereto a cylinder 91. The cylinder 91 has a double-acting piston disposed therein (not shown), and a piston rod 92 extends from said cylinder and through the supporting member 90 and is connected to the header 89. Thus, upon the delivery of a suitable fluid to one end or the other of the cylinder 91 by means of the conduits 92, the header 89 will be moved within the trackways 88 either towards or away from the side walls 68.

The headers 89 each have mounted therein a plurality of vertically spaced hollow tapered finger members 94 which are perforated throughout the greater portion of their length. The headers 89 are connected to a suitable source of air under pressure (not shown) for the purpose of delivering air to said hollow tapered finger members 94 so that when said headers are actuated by the piston within the cylinder 91, and caused to move towards the side walls 68 of the decomposition chamber 66 the tapered finger members will be moved into the refuse material contained on the conveyor 73 and contemporaneous with such movement of such fingers, air will be delivered through the perforations in the fingers and into the material being composted. Thus, it will be seen that not only will air be continuously introduced into and circulated within the decomposition chamber 66 by means of the fan 83, but through the hollow tapered finger members 94 air will be introduced into the material as it is moved along the conveyor 73. Thus, bacterial action of the aerobic processing of the refuse material will be enhanced and expedited within the decomposition chamber 66 as a result of the controlled aeration. It is to be understood that the decomposition chamber 66 may readily have a number of trackways 88 mounted on the outer surface of the side walls 68 with the reciprocating headers 89 and hollow tapered finger members associated therewith for perforating and aerating the refuse material at a number of different stations during the travel of the material upon the conveyor.

Figure 12:
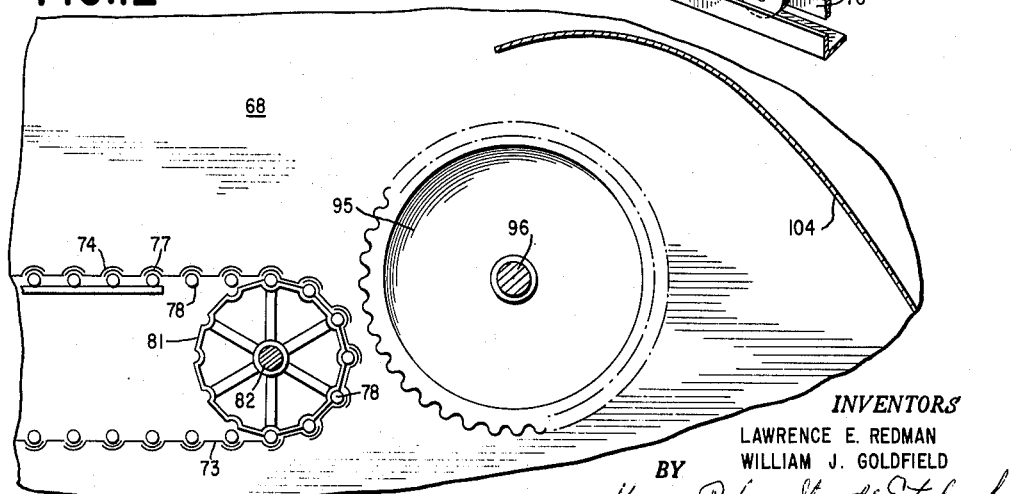
FIG. 12 is an enlarged elevational view of one end of one of the conveyors with the aerating fluffing member associated therewith.

As shown in FIGS. 8 and 12, the delivery end of the conveyor disposed within the upper portion of the decomposition chamber 66, has a rotatable member disposed adjacent thereto for the purpose of engaging and fluffing or breaking up the waste or refuse material as it is delivered from the discharge end of the conveyor 73. As shown in FIGS. 12 and 13, the rotatable member comprises an aerating or fluffing wheel 95 of a length commensurate with the width of the conveyor 73 and which is carried by a shaft 96 that is rotatably supported within the side walls 68 of the decomposition chamber 66. As shown in FIG. 13, one of the side walls 68 has a bracket 97 mounted thereon which is adapted to slidably support a plate-like member 98 having a motor 99 secured thereto. The motor 99 is provided with a drive shaft 100 which has suitable gearing (not shown) associated therewith for rotatably driving the shaft 96 and in turn rotating the aerating or fluffing wheel 95 in a clockwise direction. Thus, as shown in FIG. 8, the rotation of the aerating or fluffing wheel 95 will result in the refuse material being engaged as it moves off of the delivery end of the conveyor element 73 and due to the convolute surface provided upon the periphery of the wheel 95, said refuse material will be broken up and fluffed in such a manner as to be thrown toward the end wall 67 of the decomposition chamber 66 from whence it will then drop on the upper run of a conveyor 73 positioned within the lower portion of the decomposition chamber 66. It is to be noted that the upper run of the lower conveyor 73 disposed with the decomposition chamber 66 has an inlet trough 101 associated therewith for guiding onto the upper run of said lower conveyor 73 the material that has been aerated and fluffed by the rotative movement of the wheel 95. In addition, there is also a guide chute 102 that is identical with the inlet chute 72 for preforming the material on said conveyor.

The plate member 98 that is slidably positioned upon the bracket 97 has an adjusting screw 103 associated therewith for moving the member 98 on the bracket 97, which movement will in turn be transmitted to the shaft 96 and wheel 95, so that said wheel may be moved towards or away from the discharge end of the upper conveyor, dependent upon the condition of the material as it is delivered therefrom. While it is not deemed necessary, it may be found desirable under certain conditions to provide an arcuate-shaped baffle member 104 within the chamber 66 which is positioned in close proximity to the wheel 95 for the purpose of aiding in the guiding and directing of the material onto the guide chute 102 and the upper run of the lowermost conveyor 73.

The conveyor positioned within the upper portion of the decomposition chamber 66 and which receives the composting material from the inlet chute 72, constitutes the first stage of the aerobic decomposing process and the delivery of the aerated and fluffed refuse material to the upper run of the lowermost conveyor constitutes the delivery to the second stage of the decomposing process. The lowermost conveyor 73 is an exact duplication of the uppermost conveyor 73 in that the pan-like elements are of the same shape and configuration and move in the same manner and in addition, suitable fans 83 are employed for introducing and circulating the air within the chamber as well as headers 89 having the hollowed tapered finger members 94 for penetrating and aerating the material as same is moved along the conveyor. The discharge end of the second stage or lowermost conveyor is not provided with an aerating or fluffing wheel, but the composting material is delivered from the end of said lowermost conveyor to a suitable grinder wherein said material is subjected to a further grinding operation from whence it is then delivered to a suitable pit associated with an endless bucket elevator device for delivering said ground material to the upper run of a conveyor disposed within the upper portion of the second decomposition chamber, which conveyor constitutes the third stage of the aerobic processing of the composting material.

The top wall 69 of the decomposition chamber 66, FIG. 8, is provided with a plenum chamber 106 for receiving the exhausted air from said chamber 66 and which chamber is in communication through suitable conduits with a water bath 107 for removing from said exhausted air any and all spores so that same are not transmitted at any time to the outside atmosphere. The spore-contaminated water within the water bath 107 is delivered by suitable pipeline 108, FIG. 1, to a water-storage tank 109, from whence spore-infested water is delivered by a suitable pump P to the discharge tubes or nozzles 58 for moistening the refuse or material to be composted as same is being delivered to the mixer drum 42. In addition to receiving water from the water bath 107, the water tank 109 also receives and stores all of the water that is used in the washing down of the hopper, storage station, picking station and the like at the end of each day's operation so that any bacteria or spores contained within the various stations heretofore mentioned will not pass to the outside but will be completely retained within and continuously re-employed in the operation of said apparatus. The water tank 109 is of sufficient size and capacity to provide sufficient moisture for wetting the refuse being processed during one day's operation, so that at the termination of a day's operation the water received from the water bath as well as the wash-down water that is delivered to the water tank, will enable the operator to determine how much additional water will have to be employed to fill the water tank to the necessary requirement for the next day's operation. Thus, said water tank can be filled during the idle time of the processing plant, which time is during the night when the water demands upon a city's water system are relatively low in comparison to the usual demands made during the daytime.

In addition to the water delivered to the mixer 41 from the storage tank 109, it may be found desirable under certain conditions to employ, in the addition thereto, certain additives of the like such as a deactivated sludge and said sludge may be withdrawn from a tank 110 and intermixed by means of a suitable valve with the water pumped from the water tank 109 and then introduced into the refuse material moving through the chute 56 of the mixer drum 41.

Thus, municipal refuse and other waste products may be decomposed according to the process of the present invention by delivering same to the receiving hopper 20 from whence they are conveyed to the storage station 21 subsequent to which they are delivered to the picking station 22, passing first through the refuse feed control 23. It is to be noted that the gate member 27 is actuated by suitable fluid means through the cylinder 34 so that said gate member may be elevated with respect to the conveyor 36 thereby permitting a constant and continuous and steady flow of material into and along the picking conveyor 57; but, in the event that the material moving through the picking station is traveling either too fast or too slow, the raising or lowering of the gate member with respect to the conveyor 36 will remedy this particular situation. In addition, the inwardly extending lip 28 of the gate member 27 is adapted to engage relatively large and bulky items and hold said items back while permitting the greater portion of the municipal refuse and other waste products to move into the picking station by means of the conveyor members and then when the movement of material reaches a slack period, the gate member 27 may be fully elevated to permit the passage into the picking area of any items that had previously been held back by said gate members.

The municipal refuse and waste products are conveyed from the picking station to the delivery chute or spout 56 for introduction into the mixer drum 42 and as the material moves through the spout 56, it is moistened or wetted by the nozzles 58 which action is controlled by movement of the arm 60 at the discharge end of the picking station. The waste and refuse material is then thoroughly mixed in the drum 42 from whence it is delivered to the grinder 65 where it is thoroughly ground to present said refuse and waste material in relatively minute form prior to its being moved to the pit or sump of the endless bucket elevator from whence it is delivered to the upper run of the uppermost conveyor 73 within the decomposition chamber 66. The refuse and waste material is moved through the upper portion of the decomposition chamber 66 or through the first decomposing stage during which time it is subjected to aeration through the penetration of the material by the hollow tapered finger members carried by the reciprocating headers 89 in addition to the continuous circulation of air through the passages 77 of the conveyor by the motor-driven fans 83 as well as the circulation of the air over, around and through the perforated sections of the material. In addition to the foregoing, the air flowing or moving through the passages 77 is carried or drawn by a chimney effect through the minute interstices normally formed in the composting material. The penetration of the material by the hollow tapered finger members 94 provides a plurality of areas closely spaced with respect to one another and wherein air can readily be forced into and flow through the material by passing into the spaces created by said finger members. Thus, the action of the motor-driven fans 83 in continuously circulating air over, around, under and through the refuse material tends to materially aid in the decomposing of the material while under a controlled aerobic digestion process. The refuse material that is delivered to the upper run of the topmost conveyor in the decomposition chamber 66 is collected on said run during an eight-hour period, after which the movement of the conveyor is discontinued and the material upon said conveyor is allowed to remain thereon for the following 16-hour period. During this particular idle or non-movement period, aeration of the composting material is being effected at a maximum rate for decomposition by means of the air being drawn through and forced around and over the refuse material by the fans 83 and, in addition, any and all exhausted air is forced into the plenum chamber 106 from whence it is then conveyed to the water bath 107, thereby prohibiting the escape of any undesirable spores or bacteria to the outside atmosphere.

At the termination of the aforementioned 16-hour period, the composting material is then delivered from the uppermost conveyor in the chamber 66 to the lowermost conveyor in said chamber; and, at the same time, a new or fresh supply of refuse material is introduced through the guide chute 72 for delivery to the topmost run of the upper conveyor while the composting material previously carried by said conveyor run is being delivered to the upper run of the lower conveyor so that after an eight-hour period both of the uppermost runs of the two conveyors in the decomposition chamber 66 contain composting material thereon. Therefore, the material in decomposition chamber 66 is in one instance undergoing its initial decomposing stage and in another instance undergoing its second decomposing stage. It is to be pointed out that the various conveyors in the several decomposition chambers all move continuously or intermittently for a definite period of time, such as a four-hour or an eight-hour period and then remain stationary for a definite period of time such as a twenty or sixteen-hour period, both of which periods constitute a single stage in the decomposition process. The composting material that is collected and retained upon the conveyor in the second stage of the decomposing operation is, after a 16-hour idle period, delivered to a grinder for further grinding of said material subsequent to which it is moved to a loading pit of an endless bucket elevator system for delivery to the upper run of a conveyor in a second decomposition chamber. The composting material is next delivered from the upper run of the topmost conveyor in the second decomposition chamber after a period of time to a fourth stage conveyor within the lower portion of the second decomposition chamber, which fourth stage is identical to the second stage in the first decomposition chamber as far as the apparatus for moving and aerating the composting material is concerned. From the fourth stage in the second decomposition chamber, the composting material is then conveyed to another grinder from whence it is delivered to an endless bucket elevator for delivery to an inlet chute associated with the upper run of a conveyor positioned in the upper portion of a third decomposition chamber, which conveyor constitutes the fifth stage of the composting operation. From the fifth stage, the composting material is delivered to a sixth stage or lower conveyor disposed within the third decomposition chamber and, after a suitable period of time therein, the material is conveyed to another grinder from whence it is delivered in its final form to a screening operation and from the screening operation the finished product is derived.

From the screening operation, any material that is rejected or not passed therethrough is then returned to the grinder, interposed between the first and second decomposition chambers, so that the composting material received from said second stage may be intermixed with the rejected or recycled material, as said recycled material functions as an additive in that it contains aerobic bacteria that tends to innoculate and aid and assist the fermentation of the composting material moving from the first decomposition chamber to the second decomposition chamber. Thus, in each of the decomposition chambers, there is an upper and a lower conveyor which constitute the two stages for each of said chambers. The composting material delivered to the upper run of each of said conveyors is deposited thereon during a time period and then said conveyors remain in an idle or stationary condition for a set period, which periods would total 24 hours; after which the conveyors are activated to move the material to the next conveyor so that said material from its initial delivery to the first decomposition chamber moves successively through six stages of fermentation and subsequently to the final grinding and screening operation from whence the finished product is obtained.

It is to be noted that the refuse material that is delivered to the first stage conveyor in the first decomposition chamber may be at a temperature of approximately 70° F. or thereabout, depending upon the surrounding ambient temperature and just prior to transfer of the composting material to the second stage or lower conveyor the temperature has risen to about 125° F. but at the time that the composting material is discharged from the end of the second-stage conveyor, its temperature is approximately 155° F. The decomposition chambers are in each and every instance provided with thermo-couples which measure the temperature of the composting material and changes in the temperature are reflected in the operational speed of the fan motors 85 for either increasing or decreasing the rotative speed of the fans and thus varying the amount or volume of atmospheric air that is being drawn into said chambers through the valves 86. As the composting material is moved from the first decomposition chamber to the grinder and then to the upper conveyor or third stage in the second decomposition chamber, it is subjected to a drop in temperature due to a change in the surrounding atmosphere and the introduction of fresh air during the grinding operation so that the material is delivered to said third stage at approximately 135° F. When the material reaches the end of the third stage it is at a temperature of approximately 145° F. and from this stage the material is delivered to the lower or fourth-stage conveyor wherein the temperature of the material is at approximately 130° F. as it is delivered to the grinder at the end of said fourth stage. The grinding operation produces a drop in the temperature of the material so that upon its delivery to the fifth stage or upper conveyor in the third decomposition chamber, the temperature is approximately 120° F., while at the end of the fifth stage the temperature is approximately 130° F. The material is subsequently delivered to the final or sixth-stage conveyor in the third decomposition chamber with the temperature at approximately 120° F., and at the time that the material is delivered to the final grinding operation, the temperature is approximately 110° F. The temperature is controlled in all of the stages of the various decomposition chambers by means of suitable thermocouples provided in said chambers, which thermo-couples through remote controls actuate the fan motors for either increasing or decreasing the degree of circulation of atmospheric air within the decomposition chambers. It is to be noted from the foregoing range of temperatures that the material moving through the second stage of the first decomposition chamber reaches the maximum temperature which is approximately 155° F., which temperature rise effects the destruction of all pathogens. It is to be further noted that the aerating or fluffing of the material as it is delivered from one stage to another stage within each of the decomposition chambers tends to open new areas of material for decomposition, and the same action or result is obtained through the grinding operation to which the material is subjected as it moves from the final stage of one decomposition chamber to the initial stage of the subsequent decomposition chamber. Thus, as the material moves through the final grinding and subsequent screening operation to a finished humus product, the material that is rejected by the screening operation and thus becomes the recycling material acts as a bacterial reseeding agent for the material that is received from the second stage of the first decomposition chamber; and, in addition, said recycled material is adapted to be further decomposed by the bacterial action that will be imposed thereupon as it, together with new composting material, moves through the second and third decomposition chambers.

In FIG. 16, there is shown a modification of the present invention wherein a single decomposition chamber is employed rather than having a plurality of separate decomposition chambers. It is to be noted that in the single decomposition chamber 115 that there are a plurality of conveyors 116 denoting the first-stage conveyor, and 117 denoting the second-stage conveyor, while the third-stage conveyor, 118 is adapted to deliver composting material to the fourth-stage conveyor 119 which, in turn, delivers the composting material to the fifth-stage conveyor 120, from whence it is delivered to the final or sixth-stage conveyor, 121. Each and every one of the conveyors shown in the single decomposition chamber 115 for all respects and purposes is identical with the conveyors shown in the three decomposition chambers 66, and it is to be noted further that the various conveyors each have an aerating or fluffing wheel associated with the discharge end thereof so that the composting material is aerated and fluffed at the end of each stage rather than introducing the material into grinders at the end of certain stages which is the procedure set forth in the primary or preferred form of the present invention. The operation of the decomposition chamber 115 is identical in all other respects with the decomposition chambers 66 heretofore described, and further description relative to said decomposition chamber and the parts thereof is believed to be unnecessary.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as claimed herein.

We claim:
1. Apparatus for making compost from fermentable organic and inorganic waste material comprising a substantially air-tight elongated decomposition chamber, an endless conveyor positioned within the upper portion of said chamber, means for driving said conveyor, means for feeding thoroughly mixed, ground and moisture-ladened waste material to an end of said conveyor until the upper run of said conveyor is completely loaded, a second endless conveyor positioned within the lower portion of said chamber in vertically spaced relation with said first conveyor, means for driving said second conveyor in a direction opposite to that of the first conveyor, said second conveyor being adapted to receive said material from the other end of said first conveyor for moving said material through said chamber in a direction toward the first end of said first conveyor, a plurality of motor-driven fans in said chamber adjacent to each of said conveyors for circulating air over and around and into said material on said conveyors for fermenting said material within said chamber, means in said chamber actuated by said fans for admitting atmospheric air thereto for controlling the fermentation of the material therein and temperature-sensing elements mounted in said chamber for controlling said fan motors, means carried by said chamber for perforating and aerating the sides of the material carried by said conveyors.

2. Apparatus for making compost from fermentable organic and inorganic waste material comprising an elongated decomposition chamber, an endless conveyor positioned within the upper portion of said chamber, means for feeding thoroughly mixed, ground and moisture-ladened material to an end of said conveyor, means for driving said conveyor to move the material from one end toward the other end of said chamber, a second endless conveyor positioned in said chamber subjacent said first conveyor, means for driving said second conveyor in a direction opposite to that of the first conveyor, a plurality of motor-driven fans in said chamber adjacent to each of said conveyors for circulating air over and around and into said material on said conveyors for the fermentation of said material, means rotatably mounted within said chamber adjacent the other end of said first conveyor for engaging said waste material as it is discharged from said conveyor to fluff and break up said material while directing same toward and onto said second conveyor, trackways secured to said chamber and projecting therefrom in a plane normal thereto, headers slidably mounted within said trackways, a plurality of hollow, tapered perforate members carried by said headers in vertically spaced relation to one another, means for delivering air under pressure to said perforate members, means engageable with said headers for moving same within said trackways to penetrate and aerate at spaced points with said perforate members the material on said conveyors for the fermentation of said material.

3. Apparatus for making compost from fermentable organic and inorganic waste material comprising an elongated decomposiiton housing including a single chamber, an imperforate endless conveyor of a width slightly less than the width of said chamber, said conveyor having a plane of travel and being positioned within the upper portion of said chamber, means for feeding thoroughly mixed, ground and moisture-ladened waste material to said chamber, a guide chute having vertically disposed side members connected by an inclined bottom member and being of a width slightly less than that of said conveyor positioned within said chamber adjacent an end of said conveyor, said side and bottom members of said chute receiving said material for shaping and extruding the material onto said conveyor in an endless preformed mass having a configuration complementary to the shape of said guide chute, means for driving said conveyor to move said mass intact in its preformed extruded condition from one end toward the other end of said chamber, a second endless conveyor positioned within said chamber subjacent said first conveyor for movement in a direction opposite to that of the first conveyor, a plurality of motor-driven fans mounted in enclosures in said chamber adjacent to each of said conveyors for circulating the air in said chamber over and around and into said preformed mass on said conveyors for decomposing said mass, means in said enclosures actuated by said fans for admitting atmospheric air into said chamber for controlling the fermentation of the material therein, a drum having a roughened surface formed thereon mounted within said chamber adjacent the other end of said first conveyor for engaging said preformed mass as it is discharged from said conveyor, said drum having its axis disposed in a plane normal to the path of travel of said conveyor and substantially parallel to the plane of travel of said conveyor, means for rotating said drum independently of the movement of said conveyor for engaging said mass as it is discharged from said conveyor to break up and fluff said mass while directing said mass upwardly and towards the other end of said chamber and onto said second conveyor.

4. Apparatus as set forth in claim 3 wherein said drum is of a length commensurate with the width of said conveyors and is adjustably mounted within said chamber for varying its position with respect to the discharge end of said first conveyor and said second conveyor is provided with a guide chute similar to the guide chute provided for the first conveyor for receiving and forming said fluffed material into a preformed mass while shaping and extruding said material onto said second conveyor.

5. Apparatus as set forth in claim 3 wherein said conveyors include a plurality of pan members each having arcuate-shaped end portions defining a central trough portion, the arcuate-shaped end portion of one pan member overlying a complementary shaped portion of an adjacent pan member, said overlying end portions being disposed in spaced parallel relation to one another and defining an air passage therebetween.

6. Apparatus for making compost from fermentable, organic and inorganic waste material comprising a decomposition chamber, an imperforate endless conveyor having a plane of travel and being positioned within said chamber, a guide chute having vertically disposed side members connected by a bottom member and being of a width slightly less than that of said conveyor positioned within said chamber adjacent an end of said conveyor, means for feeding thoroughly mixed, ground and moistured-ladened waste material at a temperature of approximately 70° F. to said guide chute, said side and bottom members of said chute receiving said material for shaping and extruding the material onto said conveyor in an endless preformed mass having a configuration complementary to the shape of said guide chute, means for driving said conveyor to move said mass intact in its preformed extruded condition from one end toward the other end of said chamber, the sides of said chamber having a plurality of spaced enclosures mounted therein, said enclosures having motor-driven fans provided therein for circulating air between said mass and chamber to engulf said preformed mass on said conveyor for decomposing said mass, one-way valves mounted in said enclosures and actuated by said motor-driven fans for admitting atmospheric air to said chamber, an elongated rotatably driven member positioned within said chamber adjacent the other end of said conveyor, said driven member having its axis disposed in a plane normal to the path of travel of said conveyor and substantially parallel to the plane of travel of said conveyor, said rotatable member being formed with a roughened corrugated surface and arranged to rotate in the same direction of movement as said conveyors, said rotatable member receiving said preformed mass from said conveyor to direct same upwardly and towards said other end of the chamber to fluff and break up said mass, and temperature sensing elements mounted in said chamber for measuring the temperature of said mass on said conveyor for controlling the speed of the motors of said fans and the actuation of said valves for drawing atmospheric air therethrough to retain the temperature of said mass at approximately 125° F. at the time of delivery of said mass to said rotatable member.

References Cited by the Examiner

UNITED STATES PATENTS

| | | | |
|---|---|---|---|
| 1,029,378 | 6/1912 | Lawton | 71—9 |
| 1,597,724 | 8/1926 | Cooke | 71—9 |
| 1,832,179 | 11/1931 | Boggiano-Pico | 71—9 |
| 2,043,265 | 6/1936 | Roeder | 71—9 |
| 2,209,613 | 7/1940 | Roeder | 71—9 |
| 2,474,833 | 7/1949 | Eweson | 71—9 |
| 2,633,412 | 3/1953 | Eweson | 23—259.1 |
| 2,820,703 | 1/1958 | Dresser et al. | 71—9 |
| 2,864,672 | 12/1958 | Brooks | 71—9 |
| 2,929,688 | 3/1960 | Riker et al. | 23—259.1 |
| 2,969,279 | 1/1961 | Pierson | 71—9 |
| 3,041,157 | 6/1962 | Crane et al. | 71—9 |
| 3,114,622 | 12/1963 | Hardy | 71—9 |

DONALL H. SYLVESTER, *Primary Examiner.*

MAURICE A. BRINDISI, ANTHONY SCIAMANNA, *Examiners.*